United States Patent

Cho et al.

[11] Patent Number: 5,818,141
[45] Date of Patent: Oct. 6, 1998

[54] SQUIRREL CAGE TYPE ELECTRIC MOTOR ROTOR ASSEMBLY

[75] Inventors: Chahee P. Cho; William P. Krol, Jr., both of Portsmouth, R.I.

[73] Assignee: The United States of America as represented by the Secretary of the Navy, Washington, D.C.

[21] Appl. No.: 706,593

[22] Filed: Sep. 5, 1996

[51] Int. Cl.[6] .................................................. H02K 17/16
[52] U.S. Cl. ........................ 310/211; 310/212; 310/44; 310/264; 310/124; 310/125
[58] Field of Search .................... 310/210, 211, 310/212, 44, 264, 124, 125, 191

[56] References Cited

U.S. PATENT DOCUMENTS

| | | | |
|---|---|---|---|
| 729,449 | 5/1903 | Thomson | 310/211 |
| 1,375,461 | 4/1921 | Kimble | 310/211 |
| 2,401,187 | 5/1946 | Prince | 310/211 |
| 3,221,196 | 11/1965 | Henry-Baudot | 310/268 |
| 5,435,859 | 7/1995 | Torii et al. | 148/103 |

FOREIGN PATENT DOCUMENTS 2269234  12/1975  France .

*Primary Examiner*—Thomas M. Dougherty
*Assistant Examiner*—B. Mullins
*Attorney, Agent, or Firm*—Michael J. McGowan; Prithvi C. Lall; Michael F. Oglo

[57] ABSTRACT

A squirrel cage type electric motor rotor assembly includes first and second end plates of circular configuration, rigid tubes extending from the first plate to the second plate, the tubes being closed at either end thereof to define enclosed chambers therein, and granules of magnetic material disposed in the chambers, the granules being packed therein with a density leaving them readily movable to align with magnetic fields.

12 Claims, 2 Drawing Sheets

SQUIRREL CAGE TYPE ELECTRIC MOTOR ROTOR ASSEMBLY

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to electric motors, and is directed more particularly to an improved squirrel cage rotor for use in electric motors.

(2) Description of the Prior Art

Two types of electric motors in common use are (1) the permanent magnet motor, and (2) the induction motor. In the permanent magnet motor, permanent magnets typically are disposed in a rotor assembly which is surrounded by, or otherwise adjacent to, a stator having electrical windings thereon. Application of electrical current to the stator windings induces a reaction in the permanent magnets of the rotor, causing the magnets to move and, thereby, the rotor to turn. The permanent magnet motor initially is of high efficiency, but in due course the efficiency decreases, as does reliability, as the magnetic strength of the permanent magnets decreases. In induction motors, the rotor assembly comprises a generally cylindrically-shaped unit wherein the sides of the unit are formed by a series of spaced electrically conductive metal bars, extending from one end of the rotor to the other. An associated stator assembly is disposed around the rotor and includes electrical windings. When electrical current is applied to the stator windings, the electrical field provided creates eddy currents in the metal bars, causing the bars to move, and thereby, the rotor to rotate within the stator. Because of the cage-like configuration of the rotor, it is commonly referred to as a squirrel cage rotor, and motors in which such rotors are present are referred to as "squirrel cage" induction motors. The induction motor is reliable, rugged, simple, and inexpensive. However, the efficiency of the induction motor is substantially lower than that of the permanent magnet type.

There is a need for an induction motor having the aforesaid advantages of the squirrel cage motor, but having improved efficiency.

SUMMARY OF THE INVENTION

Accordingly, an object of the invention is to provide a squirrel cage type motor rotor assembly which provides to an electric motor of which the rotor is a part, the customary advantages of a squirrel cage motor, but also provides efficiencies approaching those of permanent magnet motors.

With the above and other objects in view, as will hereinafter appear, a feature of the present invention is the provision of a squirrel cage type electric motor rotor assembly comprising first and second plates of circular configuration, rigid tubes extending from the first plate to the second plate, the tubes being closed at either end thereof to define enclosed chambers therein, and granules of magnetic material disposed in said chambers and having sufficient freedom of movement to align with magnetic fields.

In accordance with a further feature of the invention, the assembly is provided with electrically conductive solid metal bars extending from the first plate to the second plate.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of the invention may be employed in various and numerous embodiments without departing from the scope of the invention.

BRIEF DESCRIPTION OF THE DRAWINGS

The accompanying drawings show illustrative embodiments of the invention. A better understanding of the invention and its novel feature and advantages may be had by reference to the following detailed description when considered in light of the accompanying drawings wherein.

DESCRIPTION OF THE PREFERRED EMBODIMENTS

Figure 1:
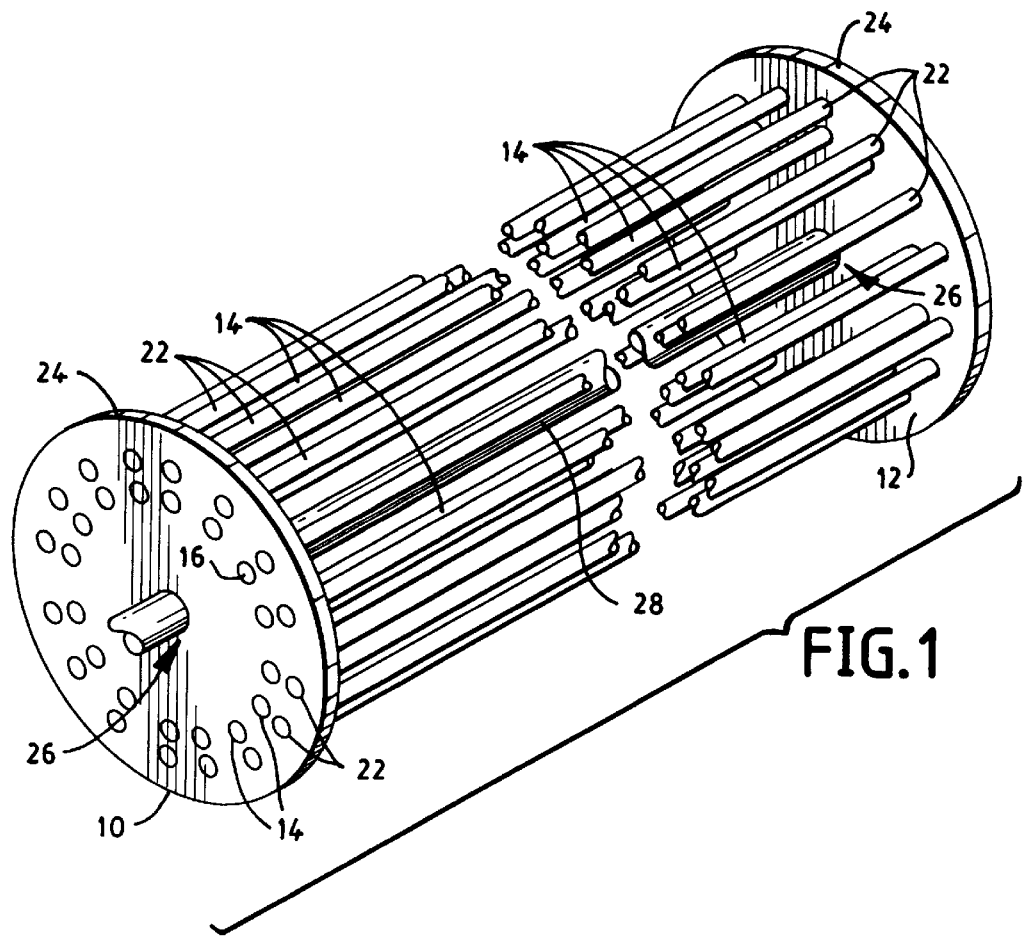
FIG. 1 is an interrupted perspective and diagrammatic view, of a squirrel cage type electric motor rotor assembly illustrative of an embodiment of the invention.
Figure 3:
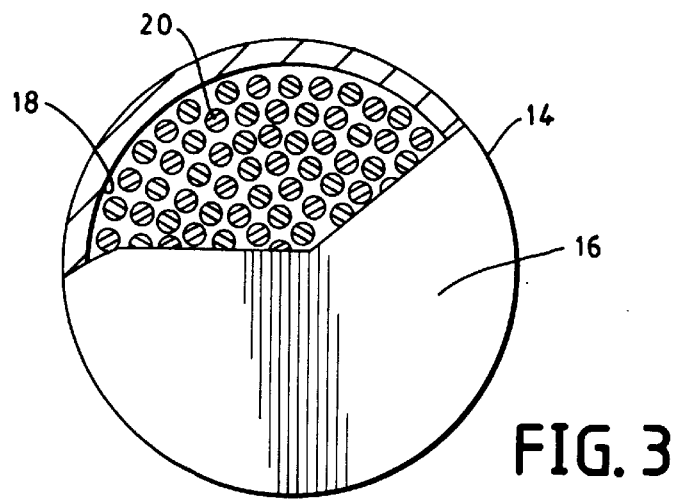
FIG. 3 is a broken-away end elevational view of a single tube of the rotor of FIG. 1.

Referring to FIG. 1, it will be seen that an illustrative embodiment of the improved squirrel cage type electric motor rotor assembly includes first and second end plates 10, 12. Rigid tubes 14, of electrically conductive metal, extend from first end plate 10 to second end plate 12. The tubes 14 are closed at either end 16 thereof to define enclosed chambers 18 (FIG. 3) within each tube 14. Granules 20 of magnetic material are disposed in the chamber 18. The granules 20 preferably are of neodymium-boron-iron (Nd-B-Fe), or samarium-cobalt (SmCo), and preferably are in powdered form. However, other magnetic materials can serve the purpose, as can coarser grades of granules. The granules 20 substantially fill the chamber 18, as shown in FIG. 3, but are packed therein with a density leaving them readily movable to align with magnetic fields.

Figure 2:
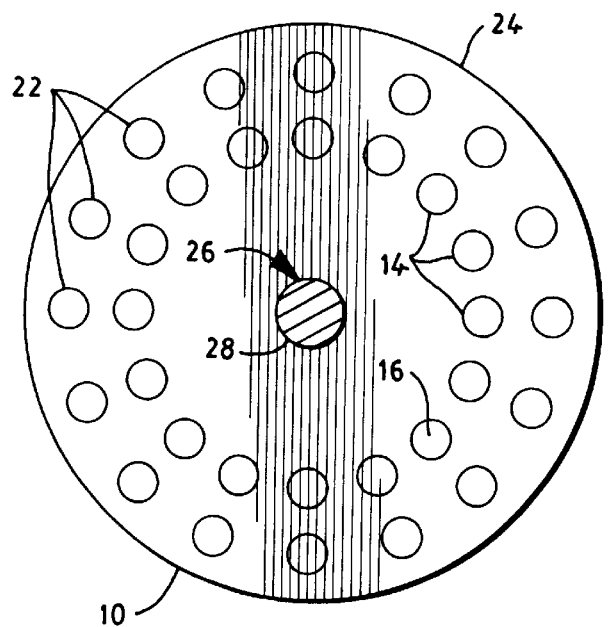
FIG. 2 is an end elevational view of the rotor of FIG. 1.

Referring again to FIG. 1, the improved squirrel cage rotor includes the usual electrically conductive solid metal bars 22 extending from first end plate 10 to second end plate 12. As shown in FIGS. 1 and 2, bars 22 are disposed proximate peripheries 24 of first and second end plates 10, 12, and tubes 14 are disposed nearer center portions 26 of end plates 10, 12 than are bars 22. The bars 22 and tubes 14 are arranged in circular fashion on end plates 10, 12 concentrically around a central shaft 28 on which the end plates are rotatably mounted. The circle of bars 22 is disposed concentrically with, and outwardly from, the circle of tubes 14.

The new rotor is thus a combination of the known squirrel cage rotor and a permanent magnet rotor. Upon excitation of a stator adjacent the above-described rotor, the magnetically active tubes 14 provide a substantially increased electrical field, with substantially increased eddy currents in bars 22. The result is a substantial increase in power output for a motor of given size, or, for a desired output, a reduction in the size of motor required. Motor efficiency is greatly improved. Further, by varying the current applied to an adjacent stator, the strength of the permanent magnet field may be varied, providing improved control. Still further, after depletion of magnetic strength of the magnetic material, the rotor still functions as a customary squirrel cage rotor, increasing reliability and active motor life relative to known permanent magnet motors.

Figure 4:
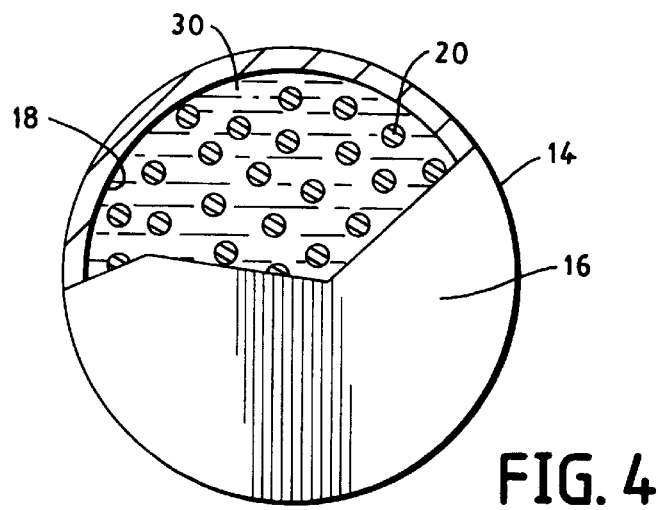
FIGS. 4 and 5 are similar to FIG. 3 but illustrative of alternative embodiments of rotor tubes.

Referring to FIG. 4, there is illustrated an alternative embodiment in which tubes 14 are filled with a liquid 30 and the granules 20 are disposed in the liquid. The liquid 30 is of substantially the same density as granules 20, such that the granules are free to move in liquid 30 to self-align with an applied force field.

Figure 5:
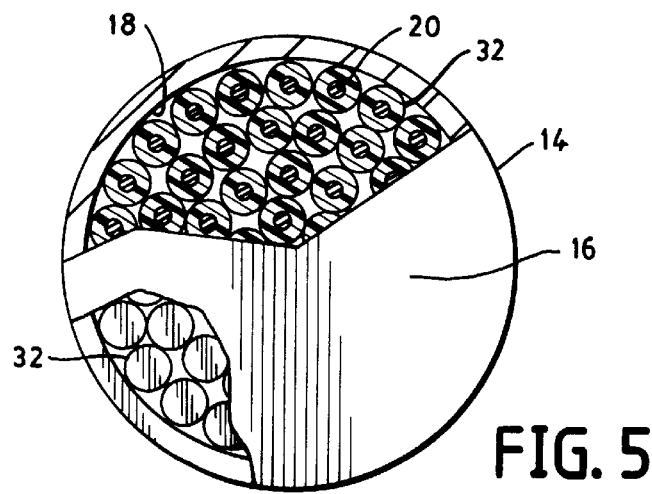

Referring to FIG. 5, there is illustrated another alternative embodiment in which each of granules 20 is embedded in a sphere 32 of non-electrically conductive and non-magnetic material, such as a plastic material.

There is thus provided a squirrel cage type motor rotor assembly which provides to an electric motor of which the rotor is a part the known advantages of a squirrel cage motor, and further provides improved efficiencies approaching those of permanent magnet motors.

It is to be understood that the present invention is by no means limited to the particular construction herein disclosed and/or shown in the drawings, but also comprises any modifications or equivalents within the scope of the claims.

What is claimed is:

1. A squirrel cage type electric motor rotor assembly, said rotor assembly comprising:

first and second end plates of circular configuration;

rigid tubes extending from said first plate to said second plate, said tubes being closed at either end thereof to define enclosed chambers therein;

electrically conductive solid metal bars extending from said first plate to said second plate; and granules of magnetic material disposed in said chambers and substantially filling said chambers with a density leaving said granules readily movable to align with magnetic fields.

2. The rotor assembly in accordance with claim 1 wherein said magnetic material comprises a selected one of Nd—B—Fe and SmCo.

3. The rotor assembly in accordance with claim 1 wherein said metal bars are disposed proximate the peripheries of said first and second plates, and said tubes are disposed nearer center portions of said first and second plates than are said bars.

4. The rotor assembly in accordance with claim 3 wherein said bars are arranged on said plates in a circular fashion, and said tubes are arranged on said plates in a circular fashion.

5. The rotor assembly in accordance with claim 3 further comprising a shaft, said first and second end plates being fixed to said shaft, said tubes being arranged in circular fashion around said shaft, and said bars being arranged in circular fashion concentrically with, and outwardly from said tubes.

6. The rotor assembly in accordance with claim 1 wherein said magnetic material is powdered.

7. The rotor assembly in accordance with claim 1 wherein said granules of magnetic material substantially fill said chambers.

8. A squirrel cage type electric motor rotor assembly, said rotor assembly comprising:

first and second end plates of circular configuration;

rigid tubes extending from said first plate to said second plate, said tubes being closed at either end thereof to define enclosed chambers therein;

granules of magnetic material disposed in said chambers; and electrically conductive solid metal bars extending from said first plate to said second plate;

wherein said tubes are filled with liquid and said magnetic material granules are disposed in said liquid and freely movable in response to an applied force field.

9. The rotor assembly in accordance with claim 8 wherein said liquid and said granules are of substantially equal densities.

10. A squirrel cage type electric motor rotor assembly, said rotor assembly comprising:

first and second end plates of circular configuration;

rigid tubes extending from said first plate to said second plate, said tubes being closed at either end thereof to define enclosed chambers therein;

granules of magnetic material disposed in said chambers; and electrically conductive solid metal bars extending from said first plate to said second plate;

wherein each of said granules is embedded in a sphere of non-electrically conductive, non-magnetic material.

11. The rotor assembly in accordance with claim 9 wherein said sphere is of a plastic material.

12. A squirrel cage type electric motor rotor assembly, said rotor assembly comprising:

first and second end plates of circular configuration;

rigid tubes extending from said first plate to said second plate, said tubes being closed at either end thereof to define enclosed chambers therein;

granules of magnetic material disposed in said chambers;

electrically conductive solid metal bars extending from said first plate to said second plate; and a shaft, said first and second end plates being fixed to said shaft, said tubes being arranged in circular fashion around said shaft, and said bars being arranged in circular fashion concentrically with, and outwardly from said tubes;

wherein said granules substantially fill said chambers but are packed therein with a density leaving said granules readily movable to align with magnetic fields.

* * * * *